United States Patent
Romanov

(10) Patent No.: US 9,080,458 B2
(45) Date of Patent: Jul. 14, 2015

(54) BLADE OUTER AIR SEAL WITH MULTI IMPINGEMENT PLATE ASSEMBLY

(75) Inventor: Dmitriy A. Romanov, Wells, ME (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 491 days.

(21) Appl. No.: 13/215,304

(22) Filed: Aug. 23, 2011

(65) Prior Publication Data
US 2013/0051972 A1 Feb. 28, 2013

(51) Int. Cl.
*F01D 5/08* (2006.01)
*F01D 11/08* (2006.01)

(52) U.S. Cl.
CPC ............ *F01D 11/08* (2013.01); *F05D 2240/11* (2013.01); *F05D 2260/201* (2013.01); *Y02T 50/676* (2013.01)

(58) Field of Classification Search
CPC ........... F01D 5/08; F01D 5/088; F01D 11/08; F05D 2260/201; F05D 2240/11
USPC ................ 415/115, 116, 173.1, 173.2, 173.4, 415/174.2, 174.4
See application file for complete search history.

(56) References Cited

U.S. PATENT DOCUMENTS

| | | | |
|---|---|---|---|
| 3,348,622 A | 10/1967 | Papst | |
| 3,597,102 A | 8/1971 | Unsworth | |
| 3,728,039 A | 4/1973 | Plemmons et al. | |
| 3,825,364 A | 7/1974 | Halila et al. | |
| 3,975,901 A | 8/1976 | Hallinger et al. | |
| 4,177,004 A | 12/1979 | Riedmiller et al. | |
| 4,222,707 A | 9/1980 | Drouet et al. | |
| 4,465,429 A | 8/1984 | Martin et al. | |
| 4,526,226 A * | 7/1985 | Hsia et al. | 165/109.1 |
| 4,573,865 A | 3/1986 | Hsia et al. | |
| 4,679,981 A | 7/1987 | Guibert et al. | |
| 5,048,288 A | 9/1991 | Bessette et al. | |
| 5,375,973 A | 12/1994 | Sloop et al. | |
| 5,423,659 A | 6/1995 | Thompson | |
| 5,480,281 A | 1/1996 | Correia | |
| 5,601,402 A | 2/1997 | Wakeman et al. | |
| 5,772,400 A | 6/1998 | Pellow | |
| 5,964,575 A | 10/1999 | Marey | |
| 5,993,150 A | 11/1999 | Liotta et al. | |
| 6,126,389 A | 10/2000 | Burdgick | |
| 6,146,091 A | 11/2000 | Watanabe et al. | |
| 6,368,054 B1 | 4/2002 | Lucas | |
| 6,508,623 B1 | 1/2003 | Shiozaki et al. | |
| 6,612,808 B2 | 9/2003 | Lee et al. | |
| 6,659,716 B1 | 12/2003 | Laurello et al. | |
| 6,666,645 B1 | 12/2003 | Arilla et al. | |
| 6,726,446 B2 | 4/2004 | Arilla et al. | |
| 6,779,597 B2 * | 8/2004 | DeMarche et al. | 165/169 |
| 6,877,952 B2 | 4/2005 | Wilson | |
| 6,899,518 B2 | 5/2005 | Lucas et al. | |
| 7,063,503 B2 | 6/2006 | Meisels | |
| 7,097,418 B2 | 8/2006 | Trindade et al. | |
| 7,306,424 B2 | 12/2007 | Romanov et al. | |

(Continued)

*Primary Examiner* — Liam McDowell
*Assistant Examiner* — Maxime Adjagbe
(74) *Attorney, Agent, or Firm* — Carlson, Gaskey & Olds, P.C.

(57) ABSTRACT

A multi impingement plate assembly for a Blade Outer Air Seal (BOAS) includes a first impingement plate which defines a multiple of first impingement plate holes and a second impingement plate attached to the first impingement plate. The second impingement plate includes a platform section spaced away from the multiple of first impingement plate holes to define a plate cavity.

19 Claims, 3 Drawing Sheets

(56) References Cited

U.S. PATENT DOCUMENTS 7,665,962 B1 * 2/2010 Liang .................. 415/173.1
7,670,108 B2 3/2010 Liang
2009/0169368 A1 * 7/2009 Schlichting et al. ....... 415/173.1

* cited by examiner

BLADE OUTER AIR SEAL WITH MULTI IMPINGEMENT PLATE ASSEMBLY

BACKGROUND

The present application relates to a blade outer air seal (BOAS) and more particularly to a multi impingement plate assembly therefor.

Gas turbine engines generally include fan, compressor, combustor and turbine sections along an engine axis of rotation. The fan, compressor, and turbine sections each include a series of stator and rotor blade assemblies. A rotor and an axially adjacent array of stator assemblies may be referred to as a stage. Each stator vane assembly increases efficiency through the direction of core gas flow into or out of the rotor assemblies.

An outer case includes a blade outer air seal (BOAS) to provide an outer radial flow path boundary for the core gas flow. A multiple of BOAS segments are typically provided to accommodate thermal and dynamic variation typical in a high pressure turbine (HPT) section of the gas turbine engine. The BOAS segments are subjected to relatively high temperatures and receive a secondary cooling airflow for temperature control.

SUMMARY

A multi impingement plate assembly for a Blade Outer Air Seal (BOAS) according to an exemplary aspect of the present disclosure includes a first impingement plate which defines a multiple of first impingement plate holes and a second impingement plate attached to the first impingement plate. The second impingement plate includes a platform section spaced away from the multiple of first impingement plate holes to define a plate cavity.

A blade outer air seal assembly according to an exemplary aspect of the present disclosure includes a body that defines a first cavity separated from a second cavity by a circumferential rib. A multi impingement plate assembly defines a plate cavity, the multi impingement plate assembly circulates a secondary cooling air flow between the first cavity and the second cavity through the plate cavity.

A method of communicating a secondary cooling airflow within a gas turbine engine according to an exemplary aspect of the present disclosure includes segregating a first cavity from a second cavity by a circumferential rib and communicating the secondary cooling airflow between the first cavity and the second cavity through a plate cavity of a multi impingement plate assembly.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE DISCLOSED EMBODIMENT

Figure 1:
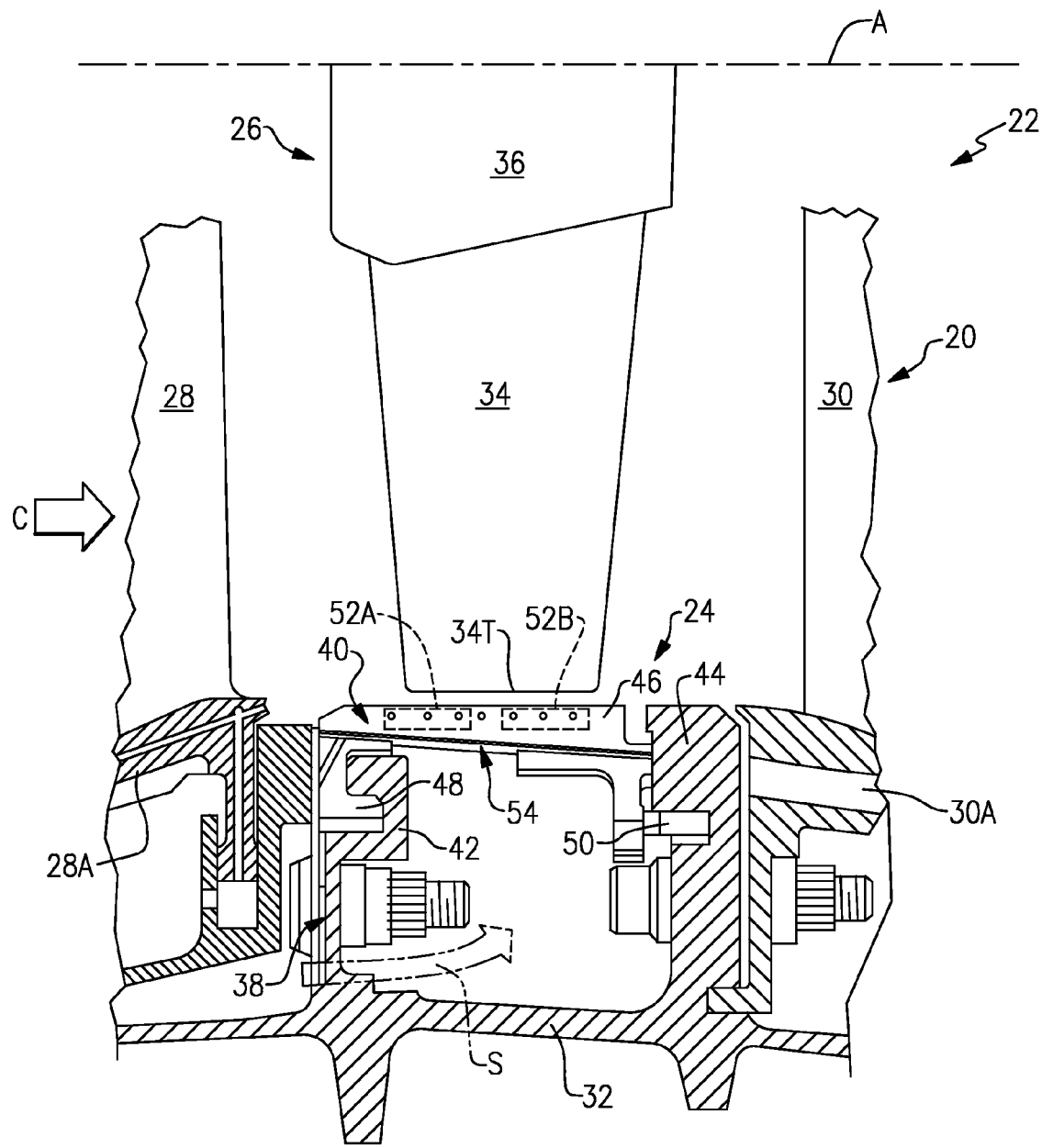
FIG. 1 is a general sectional diagrammatic view of a gas turbine engine HPT section.

FIG. 1 schematically illustrates a gas turbine engine 20, illustrated partially herein as a High Pressure Turbine (HPT) section 22 disposed along a common engine longitudinal axis A. The engine 20 includes a Blade Outer Air Seal (BOAS) assembly 24 to provide an outer core gas path seal for the turbine section 22. It should be understood that although a BOAS assembly for a HPT of a gas turbine engine is disclosed in the illustrated embodiment, the BOAS assembly may be utilized in any section of a gas turbine engine. The BOAS segment may find beneficial use in many industries including aerospace, industrial, electricity generation, naval propulsion, pumping sets for gas and oil transmission, aircraft propulsion, vehicle engines, and stationary power plants.

The HPT section 22 generally includes a rotor assembly 26 disposed between forward and aft stationary vane assemblies 28, 30 (illustrated schematically). Outer vane supports 28A, 30A attach the respective vane assemblies to an engine case 32 (illustrated schematically). The rotor assembly 26 generally includes a multiple of airfoils 34 circumferentially disposed around a disk 36. The distal end of each airfoil 34 may be referred to as an airfoil tip 34T which rides adjacent to the BOAS assembly 24.

The BOAS assembly 24 is disposed in an annulus radially between the engine case 32 and the airfoil tips 34T. The BOAS assembly 24 generally includes a blade outer air seal (BOAS) support 38 and a multiple of blade outer air seal (BOAS) segments 40 mountable thereto (also see FIG. 2). The BOAS support 38 is mounted within the engine case 32 to define forward and aft flanges 42, 44 to receive the BOAS segments 40. The forward flanges 42 and the aft flanges 44 may be circumferentially segmented to receive the BOAS segments 40 in a circumferentially rotated and locked arrangement as generally understood.

Each BOAS segment 40 includes a body 46 which defines a forward interface 48 and an aft interface 50. The forward interface 48 and the aft interface 50 respectively engage the flanges 42, 44 to secure each BOAS segment 40 thereto. It should also be understood that various interfaces and BOAS assemblies may alternatively be provided.

Figure 2:
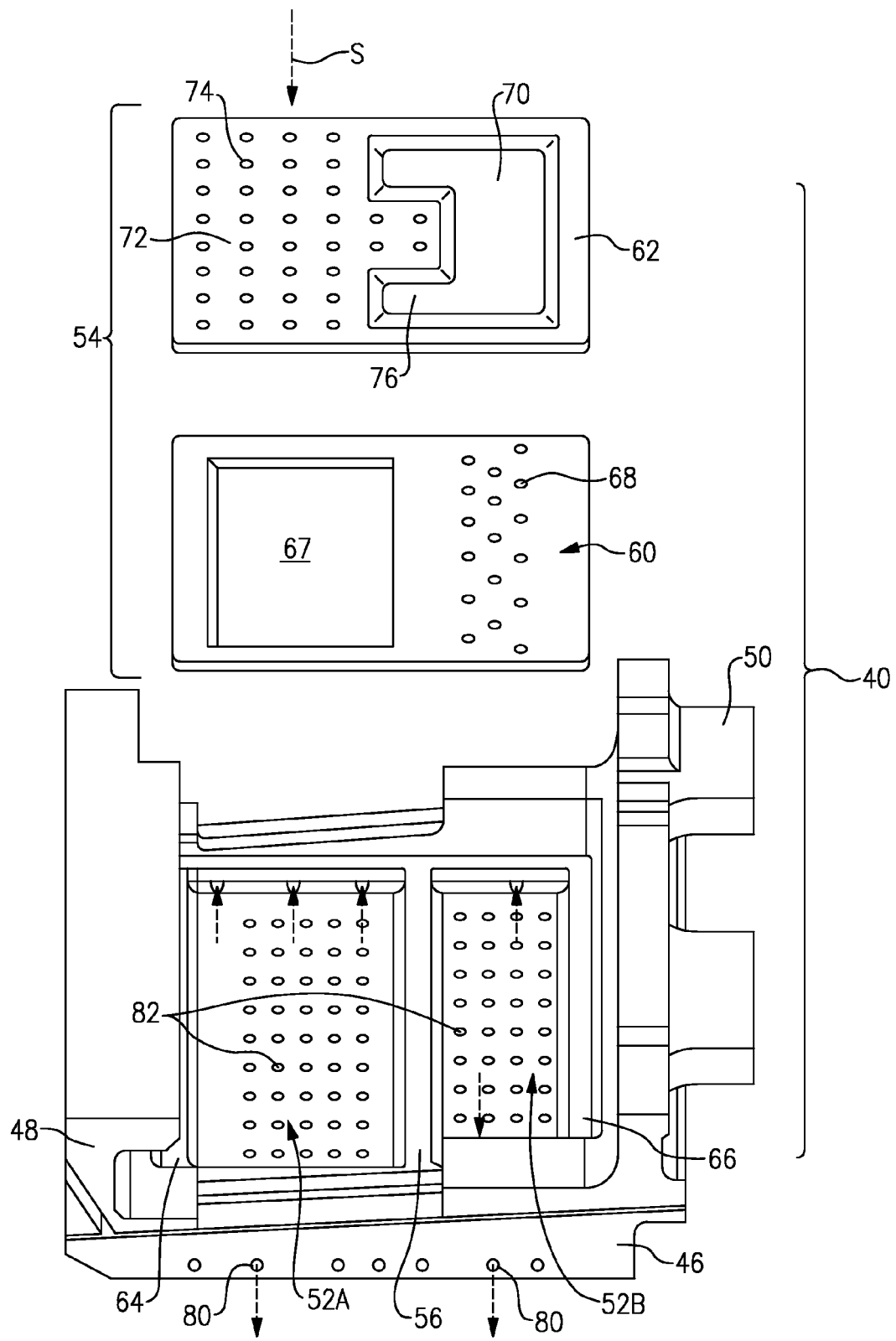
FIG. 2 is a perspective exploded view of a BOAS segment.
Figure 3:
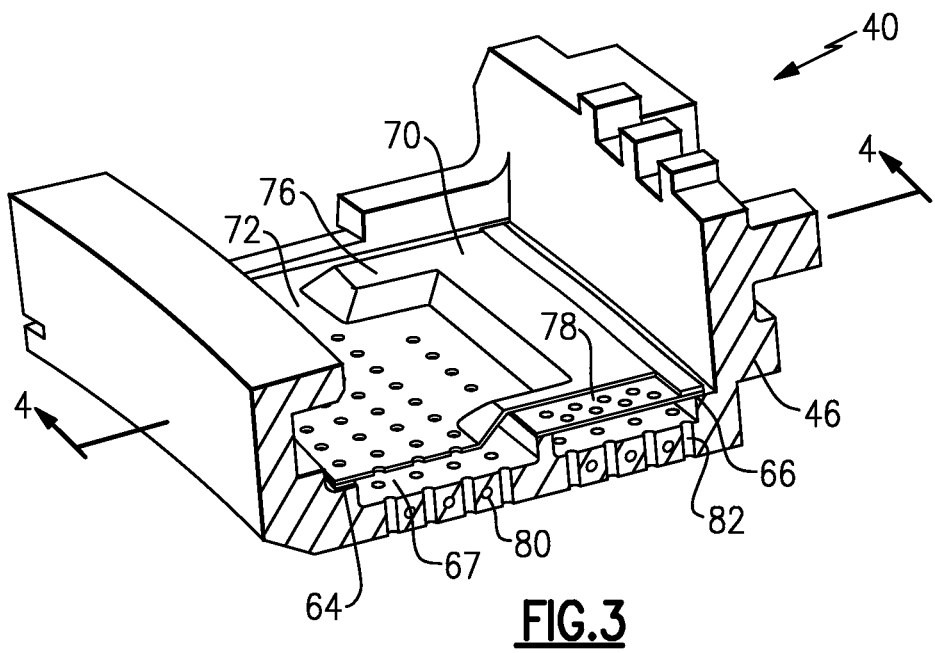
FIG. 3 is a perspective partial sectional view of the BOAS segment.

With reference to FIG. 2, each BOAS segment 40 includes at least two cavities 52A, 52B to receive a secondary cooling airflow S. In the disclosed non-limiting embodiment, the cavity 52A is axially forward of cavity 52B but separated therefrom by a circumferential rib 56. That is, the circumferential rib 56 essentially surrounds the engine longitudinal axis A. Each cavity 52A, 52B may be formed through, for example, an investment casting process then closed by a multi impingement plate assembly 54 (FIG. 3).

A multiple of edge holes 80 and a multiple of film holes 82 provide flow communication for the secondary cooling air S from the cavities 52A, 52B into the core gaspath flow C. The multiple of edge holes 80 are arranged generally circumferentially and the multiple of film holes 82 are arranged generally radially with respect to the engine axis A. It should be understood that various numbers, sizes, orientations and arrangements may be provided and that the holes 80, 82 are illustrated somewhat schematically.

The multi impingement plate assembly 54 generally includes a first impingement plate 60 and a second impingement plate 62, however, any number of plates or plate sections may be utilized. The first impingement plate 60 and the second impingement plate 62 may be welded together as a unit then welded to the body 46 (FIG. 3). That is, the multi impingement plate assembly 54 facilitates retrofit for single impingement plate BOAS designs.

Figure 4:
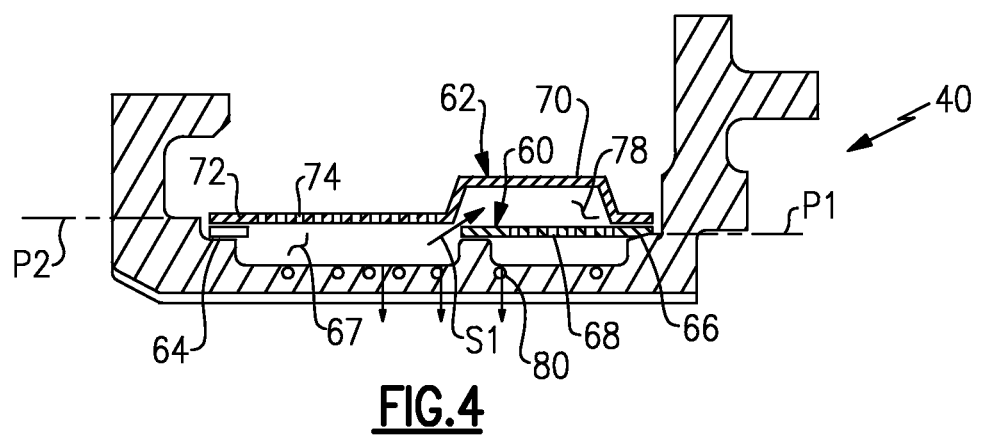
FIG. 4 is a side sectional view of the BOAS segment.

The first impingement plate 60 extends between a forward ledge 64, and an aft ledge 66 over the circumferential rib 56. The first impingement plate 60 generally includes a window 67 over the forward cavity 52A and a multiple of impingement holes 68 over the aft cavity 52B (FIG. 4). Alternatively, the first impingement plate 60 extends from the circumferential rib 56 to the aft ledge 66 to cover the aft cavity 52B.

The second impingement plate 62 extends between the forward ledge 64 and the aft ledge 66 over the first impingement plate 60. The second impingement plate 62 includes a platform section 70 which is displaced from a plane P2 which defines a base section 72. Plane P2 is parallel to plane P1 which is defined by the first impingement plate 60. The platform section 70 is imperforate while the base section 72 includes a multiple of impingement holes 74. The second impingement plate 62 may be welded along a periphery of the first impingement plate 60 to form a spaced relationship therebetween over the multiple of impingement holes 68.

At least one passage 76 extends between the platform section 70 and the base section 72 beyond the circumferential rib 56 (best seen in FIG. 3). That is, the at least one passage 76 provides a transition between the platform section 70 and the base section 72 for communication of the secondary cooling air S from the forward cavity 52A to a plate cavity 78 between the platform section 70 and the first impingement plate 60. In the disclosed non-limiting embodiment, the passage 76 may include a set of passages 76 which may be generally U-shaped and is displaced from the plane P2 which includes the base section 72

The at least one passage 76 provides a fluid communication path $S_1$ (FIG. 4) for the secondary cooling air S which enters through the multiple of second impingement holes 74 into the forward cavity 52A through the window 67 of the first impingement plate 60. The secondary cooling air S provides impingement cooling of the BOAS surface in the forward cavity 52A then exits out to the core gaspath flow C (FIG. 1) through the multiple of edge holes 80 and the multiple of film holes 82.

The secondary cooling air S then enters into the plate cavity 78 through the passage 76. From the plate cavity 78, the secondary cooling air S exits through the multiple of first impingement holes 68 into the aft cavity 52B to provides impingement cooling in the aft cavity 52B then exits out to the core gaspath flow through the multiple of edge holes 80. Approximately 80% of that secondary cooling air S flows out through the multiple of film holes 82 and 20% through the multiple edge holes 80.

The multi impingement plate assembly 54 allows some of the forward cavity 52A secondary cooling air S to be reused in the aft cavity 52B which results in lower temperatures and relatively lower cooling flow requirements for the BOAS segment 40. In the disclosed non-limiting embodiment, the secondary cooling air S gaspath pressure within the BOAS segment 40 is lower axially aft along the airfoil tips 34T (FIG. 1). The forward cavity 52A thus has a somewhat higher static pressure than the aft cavity 52B due to the direction of primary core flow. This generates a higher pressure ratio across the BOAS and tends to "withdraw" air from the forward cavity 52A to the aft cavity 52B which facilitates operation of and cooling efficiency through the multi impingement plate assembly 54. The higher static pressure in cavity 52A also results in increased axial crossflow heat transfer coefficient (Hc) in the forward cavity 52A which results in, for example, lower temperatures, and, thereby, longer operational life of the BOAS.

The multi impingement plate assembly 54 also provides additional cooling benefit by recirculating secondary cooling air from the forward cavity 52A into the aft cavity 52B without increased supply pressure. Estimation of cooling flow benefit through simulation is ~0.06% turbine core flow (Wae). Thermal analysis of the multi impingement plate assembly 54 configuration provides a benefit of ~0.06% cooling flow reduction relative to a conventional, single-plated design which equates to a flow reduction is equivalent ~0.006% Thrust Specific Fuel Consumption (TSFC).

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A multi impingement plate assembly for a Blade Outer Air Seal (BOAS) comprising:
    a first impingement plate located in a first plane including a multiple of first impingement plate holes, a window, and a first axial length; and
    a second impingement plate having a second axial length and attached to said first impingement plate, said second impingement plate includes a platform section spaced away from said multiple of first impingement plate holes to define a plate cavity, wherein the first axial length is approximately equal to the second axial length and said second impingement plate includes a base section defined within a plane, said platform section parallel and spaced away from said plane and said base section includes a multiple of second impingement plate holes.

2. The multi impingement plate assembly as recited in claim 1, wherein said platform section is solid.

3. The multi impingement plate assembly as recited in claim 1, further comprising at least one passage which transitions between said base section and said platform section.

4. The multi impingement plate assembly as recited in claim 1, wherein said second impingement plate includes a multiple of second impingement plate holes spaced axially offset from said multiple of first impingement plate holes.

5. A blade outer air seal assembly comprising:
    a body which defines a first cavity separated from a second cavity by a circumferential rib; and
    a multi impingement plate assembly including a first impingement plate having a first axial length and a second impingement plate having a second axial length that define a plate cavity, said first axial length is approximately equal to said second axial length, said multi impingement plate assembly circulates a secondary cooling air flow between said first cavity and said second cavity through said plate cavity, wherein a radially outermost surface on said first impingement plate is located radially inward from a radially innermost surface on said second impingement plate and said first impingement plate includes a window adjacent to a multiple of first impingement plate holes said second impingement plate includes a platform section spaced away from said multiple of first impingement plate holes to define said plate cavity and said second impingement plate includes a base section defined within a plane, said platform section parallel and radially outward from said plane.

6. The blade outer air seal assembly as recited in claim 5, wherein said first impingement plate defines a multiple of first impingement plate holes and said second impingement plate is attached to said first impingement plate.

7. The blade outer air seal assembly as recited in claim 5, wherein said multiple of first impingement plate holes are located adjacent to said second cavity.

8. The blade outer air seal assembly as recited in claim 7, wherein said second impingement plate includes a multiple of second impingement plate holes adjacent to said first cavity.

9. The blade outer air seal assembly as recited in claim 8, wherein said second impingement plate defines a passage which spans said circumferential rib to provide fluid communication with said plate cavity.

10. The blade outer air seal assembly as recited in claim 5, wherein said first cavity and said second cavity include a multiple of edge holes to communicate a cooling flow to a core flow.

11. A method of communicating a secondary cooling airflow within a gas turbine engine comprising:
segregating a first cavity from a second cavity by a circumferential rib, wherein the first cavity and the second cavity include radially extending holes; and
communicating secondary cooling airflow between the first cavity and the second cavity through a plate cavity of an impingement plate assembly including a first impingement plate having a first axial length and a window adjacent a multiple of first impingement plate holes and a second impingement plate having a second axial length approximately equal to the first axial length and a platform section spaced away from said multiple of first impingement plate holes to define said plate cavity, wherein said second impingement plate includes a base section defined within a plane, said platform section parallel and radially outward from said plane.

12. The method as recited in claim 11, further comprising communicating the secondary cooling airflow into the first cavity through a multiple of second cooling air holes in a second impingement plate and said window of said first impingement plate.

13. The method as recited in claim 12, further comprising communicating the secondary cooling airflow between the first cavity and the second cavity through a passage in communication with the plate cavity.

14. The method as recited in claim 13, further comprising communicating the secondary cooling airflow from the plate cavity into the second cavity though a multiple of first cooling air holes in the first impingement plate.

15. The method as recited in claim 14, communicating the secondary cooling airflow from the first cavity and the second cavity through a multiple of edge holes to a core flow.

16. The multi impingement plate assembly as recited in claim 1, wherein said first cavity and said second cavity include a multiple of edge holes to communicate a cooling flow to a core flow.

17. The multi impingement plate assembly as recited in claim 1, wherein said first impingement plate is a separate piece from said second impingement plate.

18. The multi impingement plate assembly as recited in claim 1, wherein a radially innermost surface on said second impingement plate is spaced radially outward from a radially outermost surface on said first impingement plate.

19. The multi impingement plate assembly as recited in claim 1, wherein the first impingement plate directly contacts the second impingement plate.

\* \* \* \* \*

UNITED STATES PATENT AND TRADEMARK OFFICE
CERTIFICATE OF CORRECTION

| | | |
|---|---|---|
| PATENT NO. | : 9,080,458 B2 | Page 1 of 1 |
| APPLICATION NO. | : 13/215304 | |
| DATED | : July 14, 2015 | |
| INVENTOR(S) | : Dmitriy A. Romanov | |

It is certified that error appears in the above-identified patent and that said Letters Patent is hereby corrected as shown below:

IN THE CLAIMS:

In claim 12, column 6, line 6; after "in" replace "a" with --said--

In claim 14, column 6, line 16; delete "though" and replace with --through--

Signed and Sealed this
Eighth Day of December, 2015

Michelle K. Lee
*Director of the United States Patent and Trademark Office*